United States Patent
Jeong et al.

(10) Patent No.: US 6,725,016 B1
(45) Date of Patent: Apr. 20, 2004

(54) METHOD AND APPARATUS FOR MANAGING MULTIPATH SIGNALS FOR A RECEIVER WITH MULTIPLE DEMODULATORS

(75) Inventors: Gibong Jeong, San Diego, CA (US); Luis Aldaz, San Jose, CA (US); Daniel Jeng Hsia, Del Mar, CA (US); Juncheng C. Liu, San Diego, CA (US); Greg Luker, Ramona, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 540 days.

(21) Appl. No.: 09/679,057

(22) Filed: Oct. 2, 2000

(51) Int. Cl.$^7$ .................................. H04B 1/10
(52) U.S. Cl. .............. 455/65; 455/277.1; 455/277.2; 455/278.1; 375/347
(58) Field of Search ............... 455/65, 277.1, 455/277.2, 278.1, 279.1, 296, 304, 561, 101, 135, 63, 276.1; 375/141, 145, 140, 144, 147, 347, 349, 267, 148

(56) References Cited

U.S. PATENT DOCUMENTS

| | | | | |
|---|---|---|---|---|
| 5,233,626 A | * | 8/1993 | Ames .......................... | 375/148 |
| 5,414,734 A | * | 5/1995 | Marchetto et al. .......... | 375/267 |
| 5,490,165 A | | 2/1996 | Blakeney, II et al. ....... | 375/205 |
| 5,509,038 A | * | 4/1996 | Wicki .......................... | 375/371 |
| 5,542,101 A | * | 7/1996 | Pal .............................. | 455/65 |
| 5,949,817 A | * | 9/1999 | Marshall ..................... | 375/142 |
| 6,151,487 A | * | 11/2000 | Kim et al. ................... | 455/134 |
| 6,310,856 B1 | * | 10/2001 | Taipale ........................ | 370/208 |
| 6,507,568 B2 | * | 1/2003 | Kumar et al. ............... | 370/329 |
| 2002/0193146 A1 | * | 12/2002 | Wallace et al. ............. | 455/562 |
| 2003/0087660 A1 | * | 5/2003 | Sendonaris ................. | 455/522 |

* cited by examiner

Primary Examiner—Pablo N Tran
(74) Attorney, Agent, or Firm—Peter Zawilski

(57) ABSTRACT

A method for managing multipath signals to be demodulated by a receiver with multiple demodulators. The method includes a series of steps, including receiving the multipath signals at a wireless communication receiver device, finding the multipath signals having sufficient signal strength for demodulation, and measuring an arrival time of one of the multipath signals. In one embodiment, the present invention also recites measuring a signal-to-noise ratio (SNR) level of one of the multipath signals, updating a multipath list with the arrival time and the signal-to-noise ratio if the multipath signal is identified based upon the arrival time with one of the multipath signals existing in the multipath list, and identifying newly-found multipath signals and evaluating one of the newly-found multipath signals based on the signal-to-noise ratio for categorization into one of a plurality of states. Additionally, in one embodiment of the present invention, the present method includes evaluating one of the existing multipath signals based on the signal-to-noise ratio for moving the multipath signal from one to another of a plurality of states, selectively providing one of the multipath signals for a demodulation operation based upon its state, selectively rejecting one of the multipath signals from the multipath list based on the signal-to-noise ratio, and repeating several of the above mentioned operations to process all found multipath signals.

39 Claims, 5 Drawing Sheets

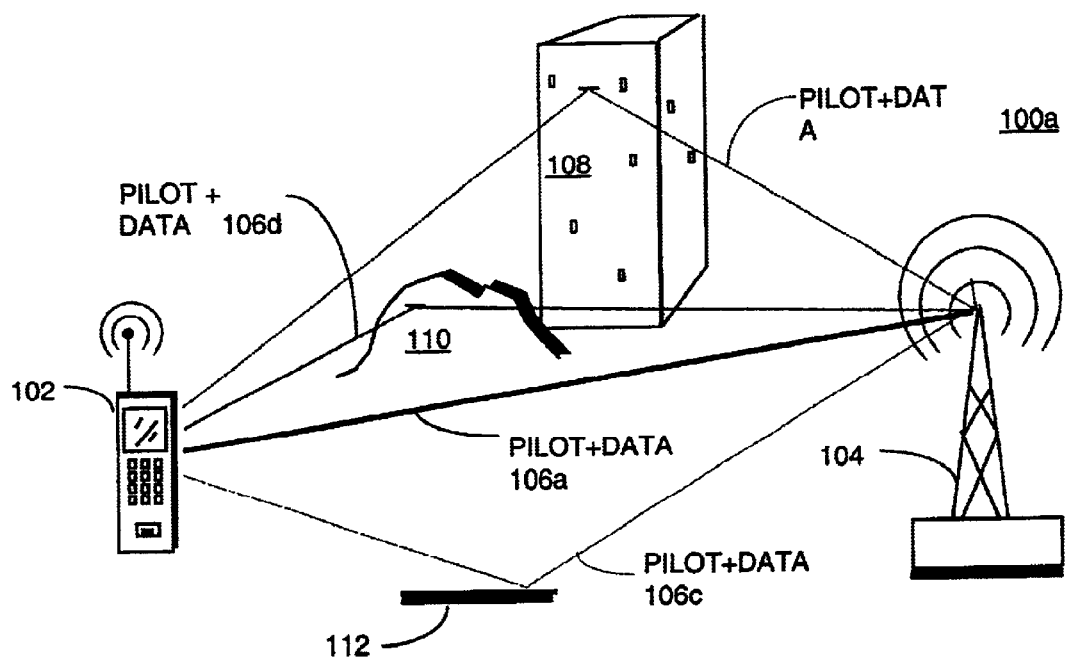
Prior Art Fig. 1A
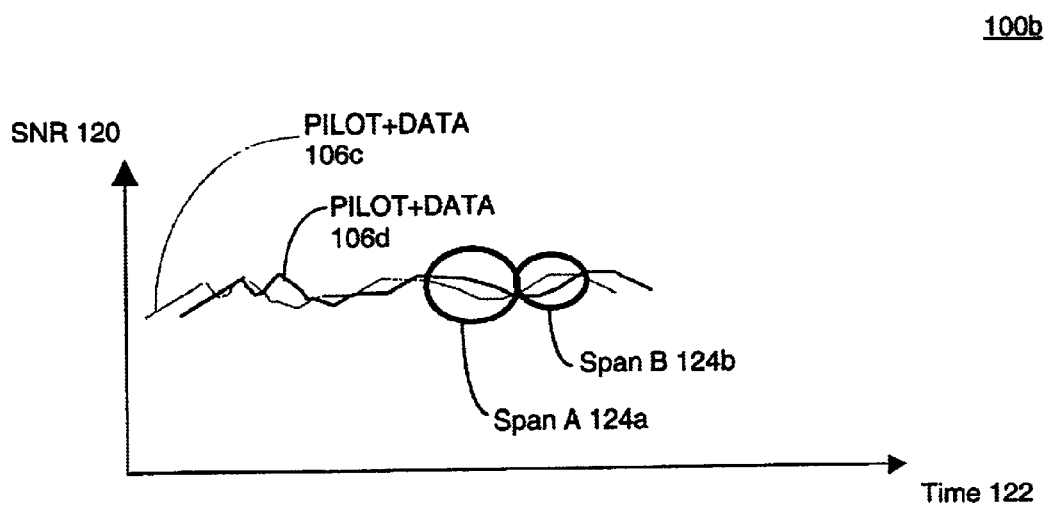
Prior Art Fig. 1B

METHOD AND APPARATUS FOR MANAGING MULTIPATH SIGNALS FOR A RECEIVER WITH MULTIPLE DEMODULATORS

TECHNICAL FIELD

The present claimed invention relates to the field of digital communication. Specifically, the present claimed invention relates to an apparatus and a method for managing multipath signals to be demodulated by a receiver with multiple demodulators.

BACKGROUND ART

Wireless telephony, e.g. mobile phone use, is a widely-used mode of communication today. Variable rate communication systems, such as Code Division Multiple Access (CDMA) spread spectrum systems, are among the most commonly deployed wireless technologies. Because of increasing demand and limited resources, a need arises to improve their capacity, fidelity, and performance.

Referring to prior art FIG. 1A, an illustration of multipath signal propagation between a conventional base station and a mobile phone is shown. A conventional base station 104 transmits a signal to a mobile station, e.g., phone, 102. Typically, the signal contains pilot information, that identifies the base station, and data information, such as voice content. A signal that can be transmitted directly to mobile phone 102 without interference, such as first signal 106a, provides the strongest signal. However, given the power limitations at which base station 104 can transmit the signal, and given the noise a signal may pick up, a need arises to improve the power and the SNR of the signal received at mobile phone.

Conventional methods will combine the portions of the transmitted signal that travel different paths to mobile unit 102. The multiple paths arise because of natural and man-made obstructions, such as building 108, hill 110, and surface 112, that deflect the original signal. Because of the paths over which these other signals travel, a time delay and performance deterioration intrinsically arises in the synchronization-sensitive and noise-sensitive data transmitted from base station 104 to mobile phone 102. However, to provide the strongest possible signal to a mobile phone, two or more of the signals from these multiple paths, e.g. path 106a–106d, may be combined. However, to efficiently combine and demodulate multipath signals, a need arises for a method to select the most worthwhile candidates from all the different multipaths received in mobile phone.

Corruption of a transmitted signal falls into two general categories: slowly-varying channel impairment and fast fading variation. Slowly-varying channel impairment arises from factors such as log-normal fading, or shadowing caused by movement or blocking as exemplified in prior art FIG. 1A, or slow fading. Slower variations, e.g., sub Hz, determine in effect, the "availability" of the channel. In contrast, only the fast fading variation affects the details of the received waveform structure and the interrelationships of errors within a message. Hence, a need arises for a method that effectively choose the properties of the signal that influence its condition for demodulation.

Referring now to prior art FIG. 1B, a graph of two conventional multipath signal strengths over time is shown. Graph 100b has an abscissa 122 of time and an ordinate of signal-to-noise ratio (SNR) 120, e.g. pilot Ec/Io ratio. Third multipath signal 106c and fourth multipath signal 106d are shown as exemplary multipath signals received at mobile phone 102. Conventional methods typically select for combining, the multipath signals with the highest SNR. Thus, at time span A 124a, the dark line representing fourth multipath signal 106d has a higher SNR level than third multipath signal 106c, assuming both signals have the same noise level. However, at time span B 124b, the dashed line representing third multipath signal 106c has a higher SNR level. Given the closeness of the SNR, or of the signal to noise ratio, of these two multipath signals, the choice as to which signal will be chosen for the demodulator can oscillate back and forth.

This oscillation is a condition known as "thrashing." The drawback with thrashing is that it consumes a significant amount of system resources, such as processor operations. During thrashing, the processor can be overloaded with operations that constantly assign and deassign the multiple demodulators to different multipath signals. Furthermore, thrashing may degrade the quality of the mobile phone 102 output signal, as the switching may cause a loss of data or an audible interference or it may introduce latency effects. Consequently, a need arises for a method to select the best multipath signal for combining while avoiding the effect of thrashing.

In summary, an apparatus and a method are needed to improve the capacity, fidelity, and performance of digital communication. More specifically, a need arises for a method to improve the power and the SNR of the signal received at mobile phone. In particular, a need arises for a method to select the most worthwhile candidates from all the different multipaths received in mobile phone for a subsequent demodulation and combining operation. Additionally, a need arises for a method to select the best multipath signal for combining while avoiding the effect of thrashing.

DISCLOSURE OF THE INVENTION

The present invention provides a method and apparatus for improving the capacity, fidelity, and performance of digital communication. More specifically, the present invention provides a method that improves the power and the SNR of the signal received at mobile phone. Beneficially, the present invention provides a method to select the most worthwhile candidates from all the different multipaths received in mobile phone for a subsequent demodulation and combining operation. Additionally, the present invention implements this method without the detrimental effects of thrashing.

In one embodiment, the present invention recites a method comprising several steps. In the first step the multipath signals are received at a wireless communication device. Next, multipath signals are searched by a searcher portion of the wireless communication device. The multipath signals having sufficient signal strength for demodulation are required. Then the SNR level and the arrival time are determined for the one multipath signal acquired. The wireless communication device stores the information about an arrival time, an SNR level, and a transmitting base station of each multipath signal found previously in a multipath list wherein the multipath signals are categorized into a plurality of states. Once the arrival time and the SNR level of the acquired multipath are determined, the multipath list is updated with the arrival time and the signal-to-noise ratio if the acquired multipath signal is identified based upon the arrival time with one of the multipath signals existing in the multipath list. Subsequently, if the acquired multipath signal does not match any one of the multipath signals existing in the multipath list based upon the arrival time, the acquired multipath signal is considered to be newly-found and the newly-found multipath signal is categorized into one of a plurality of states based upon the signal-to-noise ratio. The multipath signals in the multipath list are moved from one to another of multiple possible states based upon search measurement results. Finally, the one multipath signal acquired is evaluated for a demodulation operation based upon its state.

These states in which an acquired multipath signal may be categorized include a temporary state, a potential state, and an assigned state. The temporary state is a state to which low quality signals are categorized, a potential state is a state to which medium quality signals are categorized, and an assigned state is a state to which high quality signals are assigned. The quality of the signal is defined in terms of whether they meet certain performance thresholds. The thresholds include both a power, or SNR, level, and/or a temporal threshold, e.g. period of time over which the power, or SNR, level is maintained. That is, signals categorized in the assigned state are chosen first for demodulation because they are the highest quality signal. If no signals are categorized in the assigned state, a queue of potential signals may be available for immediate assignment to a demodulator for demodulation, thus avoiding latency problems of the prior art. By using this practice, the present invention provides a queue of potential signals that are categorized in states according to historical performance. Thus the present invention overcomes the thrashing drawbacks of the prior art signal selection by using a state environment in which to categorize the multipath signals.

In another embodiment, the present invention recites a communication device having a transceiver, a searcher, a receiver, a processor and a computer readable memory, all coupled together. The memory portion of the communication device contains program instructions that, when executed via the processor, implement the aforementioned method for managing demodulators for multipath signals in a communication device.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART FIG. 1A is an illustration of multipath signal propagation between a conventional base station and a mobile phone.

PRIOR ART FIG. 1B is graph of two conventional multipath signal strengths over time.

BEST MODE FOR CARRYING OUT THE INVENTION

Figure 2:
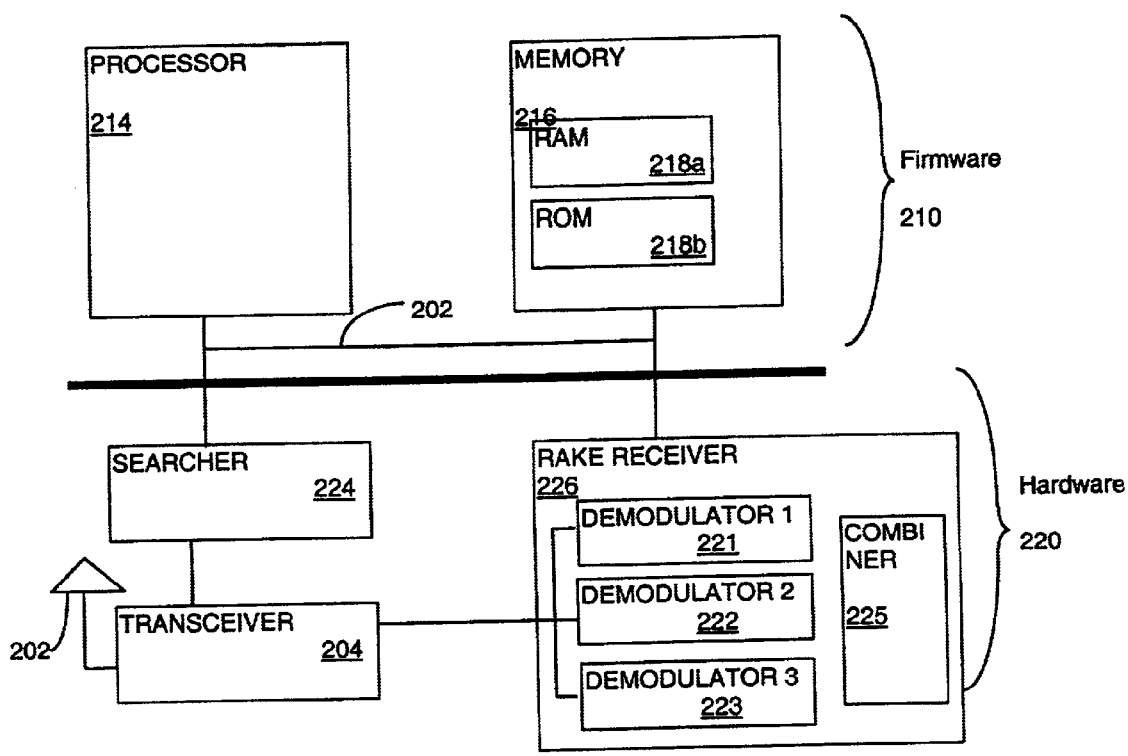
FIG. 2 is a block diagram of a communication device used to manages multipath signals, in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "acquiring," "determining," "categorizing," "evaluating," "providing," "enabling," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

Referring now to FIG. 2, a block diagram of a communication device used to manages multipath signals is shown, in accordance with one embodiment of the present invention. Communication device 200, e.g., a mobile station or phone, includes two general sections of firmware 210 and hardware 220. Firmware section 210 includes processor 214 and memory 216, coupled to each other via bus 202.

Hardware section 220 of FIG. 2 includes an antennae 202, a transceiver 204, a searcher 224, and a rake receiver 226. The antennae is coupled to the transceiver 204 which in turn is coupled to rake receiver 226 and searcher 224. Searcher 224 and rake receiver 226 are both coupled to processor 214 and memory 216. Rake receiver 226 includes multiple demodulation paths, also known as demodulating fingers or demodulators, 221–223. Each finger 221–223 is coupled to transceiver 204 so that it may independently identify and demodulate its respective multipath signal based upon its time of arrival. Rake receiver is coupled to subsequent hardware, not shown in FIG. 2, that is well known in the art for further processing of the signals. The output of demodulating fingers are coherently combined by a diversity combiner 225 to produce maximum SNR. By using a combination of hardware 220 and firmware 210, the present invention provides efficient and flexible management of multipath signals for efficient use of demodulators, as described more fully hereinafter.

Figure 3:
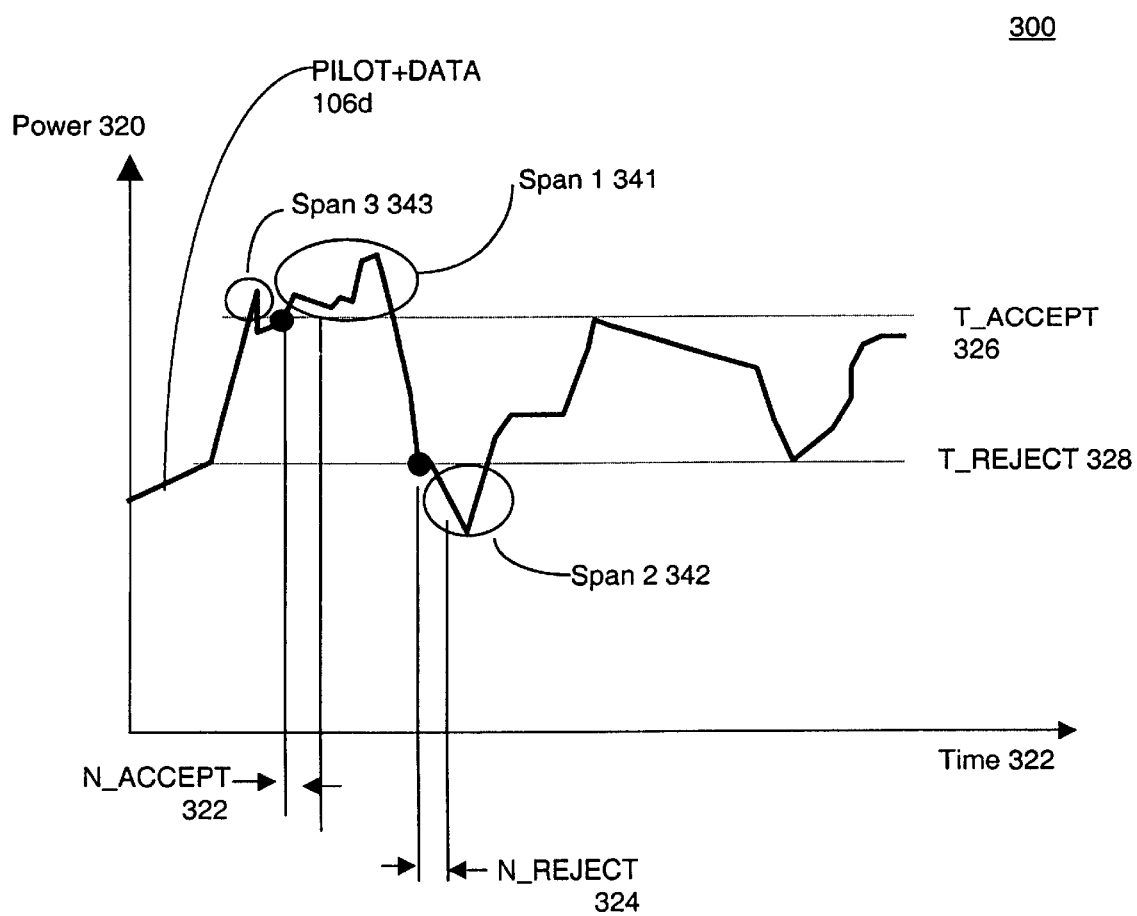
FIG. 3 is a graph of an exemplary multipath signal, to which a time threshold and a SNR threshold is applied, in accordance with one embodiment of the present invention.

Referring now to FIG. 3, a graph of an exemplary multipath signal, to which a time threshold and a SNR threshold is applied is shown, in accordance with one embodiment of the present invention. Graph 300 has an abscissa of time 322 and an ordinate of SNR 320, which can also be illustrative of signal power, assuming a constant noise level. Fourth multipath signal 106d is shown as an exemplary signal charted over a period of time. A first SNR threshold, multipath acceptance threshold (T_ACCEPT) 326, represents the threshold for which the multipath management will consider a multipath ACCEPT operation for the multipath signal in question. In conjunction with the T_ACCEPT 326 threshold, the present embodiment also shows the number threshold of measurement for acceptance (N_ACCEPT) 322 that represents a time threshold over which the signal-to-noise ratio of the signal must be maintained above T_ACCEPT wherein the signal strength of the multipath signal is above T_ACCEPT for N_ACCEPT consecutive times of searcher measurements. As shown in FIG. 3, fourth multipath signal 106d fails to satiate both these thresholds in time span 3 343. However, fourth multipath signal 106d does satiate both of these thresholds as shown in time span 1 341. While the present embodiment utilizes both a SNR threshold and a time threshold to consider a multipath ACCEPT operation for the multipath signal, the present invention is well-suited to using only a SNR threshold.

FIG. 3 also shows a second SNR threshold, multipath rejection threshold (T_REJECT) 328, which represents the threshold for which the multipath management will consider a REJECT operation for the multipath signal in question. In conjunction with the T_REJECT 328 threshold, the present embodiment also shows the number threshold of measurement for rejection (N_REJECT) threshold 324 that represents a time threshold over which the strength of the signal must be below T_REJECT for the multipath REJECT operation to proceed. As shown in FIG. 3, fourth multipath signal 106d satiates both these thresholds as shown by time span 2 342. By using a time threshold for accepting and/or rejecting a multipath signal with respect to the demodulation and combining operations, the present invention essentially provides a low pass filtering for the signal evaluation. By doing so, the present invention limits the rate of unnecessary assignment to noise signal and unnecessary deassignment of demodulating fingers from a perturbating but otherwise strong multipath signal without causing thrashing. While the present embodiment utilizes both a SNR threshold and a time threshold to consider a multipath ACCEPT operation for the multipath signal, the present invention is well-suited to using only a SNR threshold.

Figure 4:
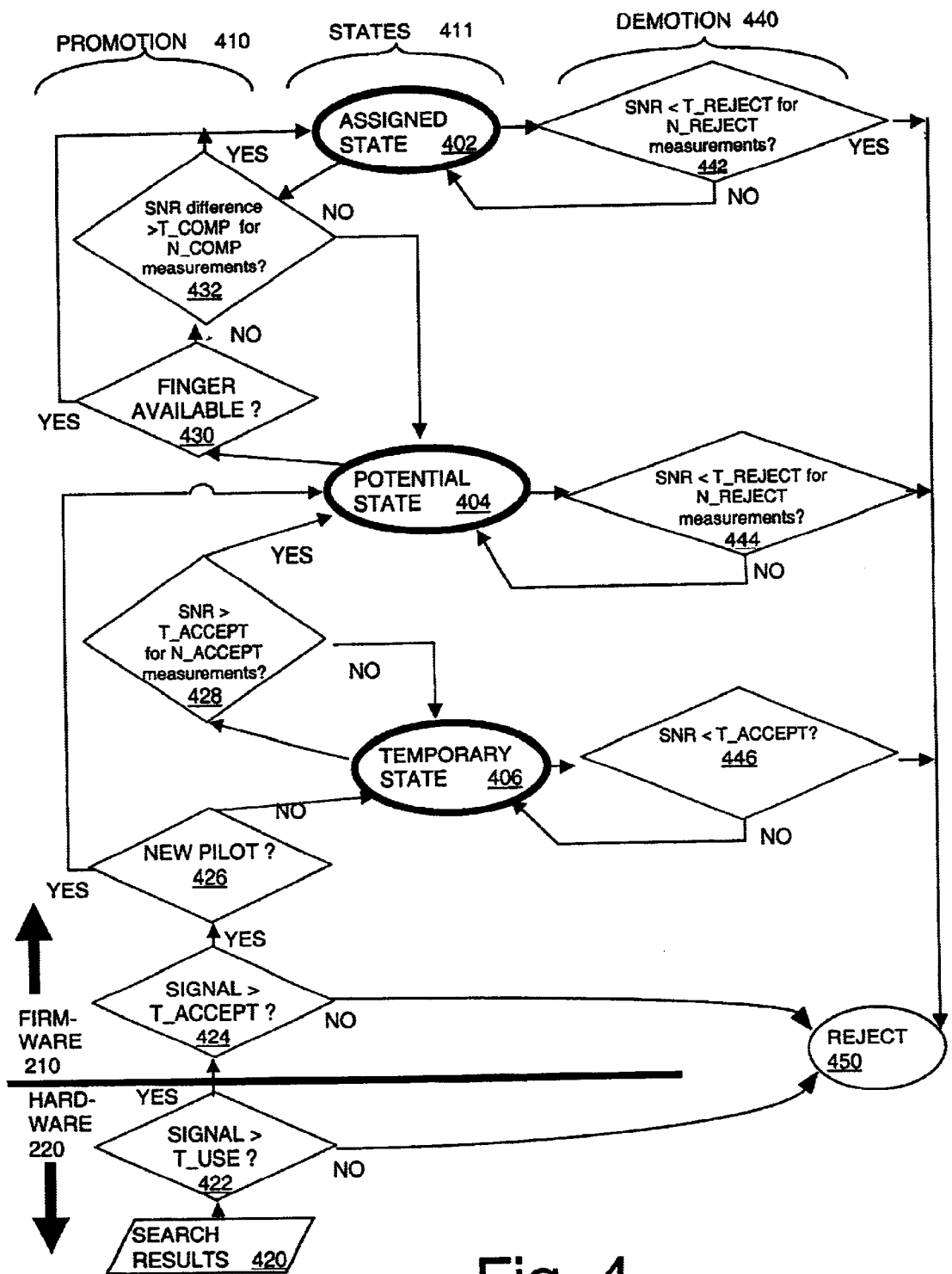
FIG. 4 is a state diagram in which multipath signals may be categorized, in accordance with one embodiment of the present invention.

FIG. 4 is a state diagram in which multipath signals may be categorized, in accordance with one embodiment of the present invention. State diagram 400 shows three states: a temporary state 402, a potential state 404, and an assigned state 406. These states are arranged in a hierarchy where temporary state 402 is the lowest state, potential state 404 is the next higher state, and assigned state 406 is the highest state. While the present embodiment shows three states, the present invention is well suited to using any number of states in any kind of hierarchy arrangement. In the present embodiment, a demodulating finger is assigned to each multipath signals categorized in assigned state and the multipath signal is enabled for demodulation. In contrast, the multipath signals categorized in any state other than assigned state are not enabled for demodulation, but can be maintained to evaluate performance over time, and thus provide future candidates for demodulation.

By having more multipath signals associated with the temporary or potential state, the present invention provides a ready supply of good-quality signals available for demodulation. This avoids some of the scheduling problems of finding a signal for an available demodulating finger, encountered in the prior art. Overall, the number of signals associated with all of the multiple states can greatly exceed the number of available demodulating fingers in a rake receiver. In this manner, the present invention provides a sequence of queues of available multipath signals that will compensate for a wide variety of signal problems.

FIG. 4 also shows how multipath signals are categorized, e.g. promoted and demoted, to and from specific states. The a column labeled promotion 420 provides a process whereby a multipath signal may be promoted to, or categorized as, a certain state. Conversely, a column labeled demotion 440 provides a process whereby a multipath signal may be demoted from a certain state. While the present embodiment provides a specific process for categorizing a signal with a state, the present invention is well suited to using a wide variety of processes and methods adaptable to specific applications.

The process of assigning a state for the present embodiment, shown in promotion column 420, starts with a searcher signal input 420 from a hardware portion 462 of a communication device. FIG. 2 provides one embodiment of hardware that implements input 420, where antennae 202 and transceiver 204 and searcher combine to provide a multipath signal (signal).

Step 422 of the present embodiment inquires whether the signal has a SNR that is greater than a predetermined threshold T_USE established by the searcher. The threshold T_USE guarantees sufficient signal strength for demodulation. If the signal does have a SNR that is greater than threshold T_USE, then the process proceeds to step 426. Alternatively, if the signal does not have a SNR that is greater than threshold T_USE, then the signal is rejected per step 450. The searcher measures an arrival time of the multipath signal with signal strength above T_USE. If the arrival time of the multipath signal does not match that of any of the multipath signals existing in the multipath list, the multipath signal is considered to be a new multipath signal.

Step 424 of the present embodiment inquires whether the new multipath signal has a SNR that is greater than a threshold T_ACCEPT. If the new multipath signal does have a SNR that is greater than threshold T_ACCEPT, then the process proceeds to step 426. Alternatively, if the new multipath signal does not have a SNR that is greater than threshold T_ACCEPT, then the new multipath signal is rejected per step 450.

Step 426 of the present embodiment inquires whether the new multipath signal is indeed a new pilot, e.g. a signal from a new base station having a new pilot identification. If the new multipath signal is a new pilot, then the process categorizes the new multipath signal to potential state 404. This special treatment for a new base station produces better cell diversity gain. Alternatively, if the new multipath signal is not a new pilot, then the process categorizes the new multipath signal to temporary state 402.

If the arrival time of the multipath signal in the search result matches that of one of the multipath signals existing in the multipath list, the arrival time and the signal-to-noise ratio of the multipath list is updated. This update process continues until arrival time and SNR of all the multipath signals from the same base station are updated. Once this update process finished, the rest of the steps in categorization proceeds as follows.

In step 428 of the present embodiment, signals that are categorized in temporary state 402 are checked in subsequent searcher operations to determine whether the signal maintains the SNR above T_ACCEPT, which itself satisfies the SNR threshold, over a time threshold, e.g. over N_ACCEPT consecutive SNR measurements. If the signal satiates the N_ACCEPT threshold per step 428, then signal is categorized in potential state 404. Alternatively, if the signal does not satiate the N_ACCEPT threshold, then it remains categorized in temporary state 402. Step 432 is illustrated, in one embodiment, by the signal performance in FIG. 3. Both span 3 343 of signal 106*d* span 1 341 satiate the T_ACCEPT 326 threshold, but only span 1 342 satiates the N_ACCEPT 322 threshold. Consequently, at a time corresponding to span 3 343, signal 106*d* would be categorized in temporary state 402, while at time corresponding to span 1 341, signal 106*d* would be categorized in potential state 404.

In step 430 of the present embodiment, an inquiry determines whether a demodulating finger is not enabled and is available for demodulation. Step 430 is implemented in one embodiment by having one of demodulating fingers in rake receiver 226 of FIG. 2 available for demodulating a multipath signal. If a demodulating finger is available, then the signal initially categorized in potential state 404 is now categorized in assigned state 406 and thus the multipath signal is used for demodulation or a demodulating finger is assigned to the multipath signal. However, if a demodulating finger is not available, then the process proceeds to step 432.

In step 432 of the present embodiment, an inquiry determines whether the signal satiates both T_COMP and N_COMP thresholds. The T_COMP threshold represents a "comparison" margin threshold by which one signal categorized in a potential state 404 has to exceed the SNR of another signal in assigned state 406 in order to be promoted to assigned state. The comparison margin threshold also includes a time threshold, N_COMP consecutive SNR measurements, over which the T_COMP threshold is satiated. If a signal categorized in a potential state 404 has ongoing SNR performance that is greater than the SNR of one particular multipath in an assigned state 406 by more than T_COMP over N_COMP consecutive measurements, then the signal categorized in a potential state 404 is promoted to an assigned state 406, and the signal categorized in an assigned state 406 is demoted to a potential state. If the two signals switch between assigned and potential states, then a demodulating finger is reassigned from one multipath signal to another. Alternatively, if a signal SNR difference does not satiate T_COMP and N_COMP requirement, then the two signals remain categorized in original states. The purpose of these two thresholds is to only allow a signal categorized in an assigned state 406 to be replaced by a signal with substantially better performance in a consistent manner over time. This process avoids constant switching of states, e.g. thrashing, for signals when their performances are very close to each other. The present invention is well-suited to using a wide range of values for T_COMP and N_COMP, as appropriate for a given application. For example, T_COMP and N_COMP can be statically based upon T_ACCEPT and T_ACCEPT, or they can be dynamically based on actual values of SNR for signals categorized in assigned state 406.

The process of demoting from a state for the present embodiment, shown in demotion column 440, starts with a evaluating a performance of a signal that has been categorized in states 402–406. Step 442 inquires whether the signal has a SNR that is less than T_REJECT, e.g. multipath REJECT thresholds that are shown in FIG. 2, over a time threshold, e.g. over N_REJECT consecutive SNR measurements. If a signal categorized in assigned state 406 has ongoing SNR performance that is less than T_REJECT satiating the N_ACCEPT threshold, then the signal is demoted from assigned state 406, and rejected in step 450. Alternatively, if a signal categorized in assigned state 402 has ongoing SNR performance that is not less than T_REJECT over N_REJECT consecutive measurements, then the signal remains categorized in assigned state 406. If a signal is demoted from assigned state 406, then a demodulating finger may open up or be deassigned, allowing step 430 to determine whether a signal categorized in potential state 404 can be categorized in the higher assigned state 406.

Step 444 provides a process similar to that of step 442. In step 444, an inquiry determines whether the signal has a SNR that is less than T_REJECT, e.g. multipath REJECT thresholds over N_REJECT consecutive SNR measurements. If a signal categorized in potential state 404 has ongoing SNR performance that is less than T_REJECT thresholds over N_REJECT consecutive SNR measurements, then the signal is demoted from the potential state 404, and rejected in step 450. Alternatively, if a signal categorized in potential state 404 has ongoing SNR performance that is not less than T_REJECT over N_REJECT consecutive measurements, then the signal remains categorized in potential state 404.

Step 446 provides a process similar to that of step 442 but without time threshold criterion. In step 446, an inquiry determines whether the signal has a SNR that is less than T_ACCEPT. If a signal categorized in temporary state 402 has ongoing SNR performance that is less than T_, then the signal is demoted from the temporary state 402, and rejected in step 450. Alternatively, if a signal categorized in temporary state 402 has ongoing SNR performance that is not less than T_ACCEPT, then the signal remains categorized in temporary state 402.

The time thresholds utilized in process 400 can be implemented, in one embodiment, by using various timers or counters that are activated at the point during which an appropriate threshold is satisfied. The present embodiment maintains a separate timer for each multipath signal associated with potential state and assigned state, as required by step 442 and 444. Thus, for example, a multipath REJECT timer implemented in hardware portion 220 of communication device 200, can be used to estimate the fading duration of the long-term fading channel. The timer is initiated when a multipath reject threshold value is satisfied, e.g. when a multipath signal's performance drops below a threshold T_REJECT, and is reset and disabled if the multipath signal exceeds the threshold T_REJECT. Various defaults and expiration values can be established for the times to accommodate zero threshold settings.

The process of categorizing signals into states, e.g. promoting them and demoting them, per FIG. 4 is performed by the present embodiment by firmware 210, such as that shown in FIG. 2. That is, states can be recorded in RAM portion 218a of memory 216 of communication device 200. By using firmware, the present invention of managing demodulating fingers can be quickly and easily modified to suit a particular application, such as continuing development discoveries. The categorizing of signals into states can be accomplished by a wide variety of methods, such as using flags, or allocating memory registers to states, etc.

Figure 5:
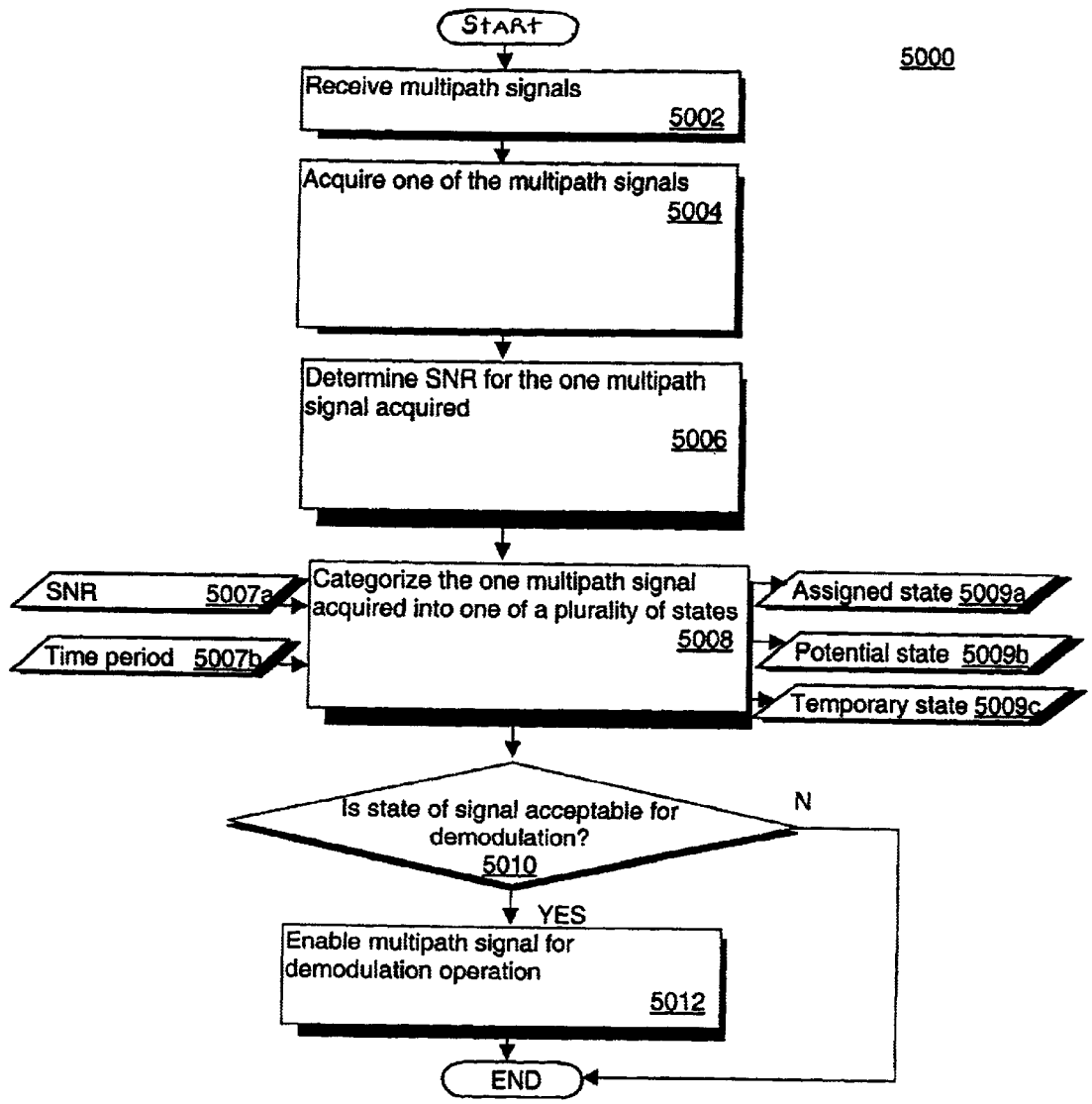
FIG. 5 is a flowchart of a process used to manage multipath signals in a communication device, in accordance with one embodiment of the present invention.

Referring now to FIG. 5, a flowchart of the process used to manage multipath signals in a communication device is shown, in accordance with one embodiment of the present invention. By using process 5000 embodiment, the present invention provides a method selects the most worthwhile candidates from all the different multipaths received in mobile phone for a subsequent demodulation and combining operation, without the detrimental effects of thrashing. While the present embodiment applies process 5000 to a CDMA digital communication system, the present invention can be applied to any communication system needing time tracking. Also, the present invention is applicable to both mobile units and base stations used for telecommunications operations.

Process 5000 begins with step 5002. In step 5002 of the present embodiment, multipath signals are received at a communication device. Step 5002 is implemented, in one embodiment, by the hardware 220 shown in FIG. 2. In one embodiment, multipath signals, such as those shown in prior art FIG. 1A, are received by antennae 202 and transceiver 204 of FIG. 2. Following step 5002, process 5000 proceeds to step 5004.

In step 5004 of the present embodiment, one of the multipath signals is acquired in terms of arrival time and signal strength. This is accomplished, in one embodiment, by a searcher portion 224 of communication device 200 of FIG. 2, as is well-known in the art. Following step 5004, process 5000 proceeds to step 5006.

In step 5006 of the present embodiment, a SNR ratio is determined for the multipath signal acquired. Step 5006 is implemented, in one embodiment, by a searcher portion 224 in conjunction with a firmware portion 210 of communication device 200 of FIG. 2, as is well-known in the art. While the present embodiment utilizes SNR to determine the quality of the acquired multipath signal, the present invention is well suited to alternative benchmarks. Following step 5006, process 5000 proceeds to step 5008.

In step 5008 of the present embodiment, the multipath signal acquired is evaluated for categorization into one of a plurality of states. Step 5006 is implemented, in one embodiment, by a firmware portion 210 of communication device 200 of FIG. 2. In one embodiment, process 400 is used to evaluate the categorization of signals into one of a plurality of states. However, the present invention is well-suited to using a wide variety of methods and criteria for evaluating a signal for categorization into a state. Following step 5008, process 5000 proceeds to step 5010.

In step 5010 of the present embodiment, an inquiry determines whether the state of the signal is acceptable for demodulation. If the state of the acquired multipath signal is acceptable for demodulation, then the process 5000 proceeds to step 4012. Alternatively, if the state of the acquired multipath signal is not acceptable for demodulation, then process 5000 proceeds to end.

In step 5012 of the present embodiment, the multipath signal is provided for a demodulation operation. Step 5012 is implemented, in one embodiment, by firmware 210 and hardware 220 portions of communication device 200 of FIG. 2. Specifically, the timing requirements for the acquired multipath signal are provided from firmware 2120 to one of the demodulating fingers, e.g. 221–223, in rake receiver 226 of communication device 200 to enable demodulation of the given multipath signal. Following step 5012, process 5000 proceeds to step 5014.

process 5000 can be repeated to accommodate a number of significant timing factors. In one embodiment, the pilots in the active set of assigned-state and potential state signals available for demodulation can be sampled in one visit. In another embodiment, they may be visited several times in a search period, each time measuring all or some of the pilots in the active set. In order to guarantee a minimum search rate of the active set, the mobile station has a periodic search timer for the active set such that the strength and pseudonoise (PN) phase of all pilots in the active set at least one per period.

Many of the instructions for steps and the data stored in memory 222 for process 300, are executed using processor 220. The memory storage for the present embodiment can either be permanent, such as read only memory (ROM), or temporary memory such as random access memory (RAM). Memory 216 can also be any other type of memory storage, capable of containing program instructions, such as a hard drive, a CD ROM, or flash memory. Furthermore, processor 214 can either be an existing system processor, or it can be a dedicated digital signal processing (DSP) processor. Alternatively, the instructions may be implemented using a microcontroller or some other state machine.

Because the demodulating finger management process shown by process 5000 uses data stored as software, the present invention provides dynamic management. For example, thresholds used in process 5000 can be stored in memory. Thus, their values can be changed, in one embodiment. Threshold values can be programmed into ROM 218b or RAM 218a portions of memory 216. Threshold values can be provided or changed via instructions and data at the time the device is manufactured or it can be communicated to the device while the device is in service with a user.

While process 5000 of the present embodiment shows a specific sequence and quantity of steps, the present invention is suitable to alternative embodiments. For example, not all the steps provided for process 5000 are required for the present invention. And additional steps may be added to those presented. Likewise, the sequence of the steps can be modified depending upon the application. Furthermore, while process 5000 is shown as a single serial process, it can also be implemented as a continuous or parallel process. For example, instead of proceeding to end step, process 5000 could return to the start step for a second multipath signal after finishing step 4012 for a first multipath signal.

Many of the instructions for the steps, and the data input and output from the steps of process 5000 is implemented utilizing memory 216 and utilizing processor 214, as shown in FIG. 2. Memory storage 216 of the present embodiment can either be permanent, such as read only memory (ROM) 218b, or temporary memory such as random access memory (RAM) 218a. Memory 216 can also be any other type of memory storage, capable of containing program instructions, such as a hard drive, a CD ROM, or flash memory. Furthermore, processor 214 can either be a dedicated controller, an existing system processor, or it can be a dedicated digital signal processing (DSP) processor. Alternatively, the instructions can be implemented using some form of a state machine.

In view of the embodiments presented herein, the present invention effectively provides a method and apparatus for improving the capacity, fidelity, and performance of wireless digital communication. Specifically, the present invention provides a method that improves the signal provided by the mobile phone via managing multipath signals in a list with plurality of states that allow flexible and efficient assignment and deassignment of demodulating fingers. Additionally, the present invention provides a method to select the most worthwhile candidates from all the different multipaths received in mobile phone for a subsequent demodulation and combining operation. Significantly, the present invention implements this method without the detrimental effects of thrashing or loss of data.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method of managing multipath signals in a plurality of states in a multipath list in a wireless communication receiver device having a plurality of demodulators and one or more searchers, said method comprising the steps of:
   a) receiving said multipath signals at said wireless communication receiver device;
   b) finding said multipath signals having sufficient signal strength for demodulation in said searcher of said wireless communication receiver device;
   c) measuring an arrival time of one of said multipath signals;
   d) measuring a signal-to-noise ratio (SNR) level of said one of said multipath signals;
   e) updating said multipath list with said arrival time and said signal-to-noise ratio if said one of said multipath signals is identified based upon said arrival time with one of the multipath signals existing in said multipath list;
   f) identifying newly-found multipath signals and evaluating one of said newly-found multipath signals based on said signal-to-noise ratio for categorization into one of a plurality of states;
   g) evaluating one of said existing multipath signals based on said signal-to-noise ratio for moving said multipath signal from one to another of a plurality of states;
   h) selectively providing said one of said one of said multipath signals for a demodulation operation based upon its state;
   i) selectively rejecting said one of said multipath signals from said multipath list based on said signal-to-noise ratio; and
   j) repeating said steps c) through i) to process all said multipath signals found in step b).

2. The method recited in claim 1 wherein said plurality of states includes three hierarchical states.

3. The method recited in claim 1 wherein said plurality of states includes an assigned state, wherein signals associated with said assigned state are used for an active demodulation operation.

4. The method recited in claim 1 wherein said plurality of states includes a potential state, wherein signals associated with said potential state are not actively used for an active demodulation operation, but which may be likely candidates for a future demodulation operation.

5. The method recited in claim 1 wherein said plurality of states includes a temporary state, wherein said temporary state is not actively used for an active demodulation operation, but which may be likely candidates for categorization in a potential state in a future evaluation.

6. The method recited in claim 1 wherein said one of said multipath signals is categorized per step d), f) and g) according to said SNR level of said one of said multipath signals.

7. The method recited in claim 1 wherein said one of said multipath signals is categorized per step d), f) and g) according to a time period over which said SNR level of said one of said multipath signals is above predetermined threshold level.

8. The method recited in claim 1 wherein said one of said multipath signals is categorized per step d), f) and g) according to the number of measurements for which said SNR level of said one of said multipath signals is above a predetermined threshold level.

9. The method recited in claim 1 wherein said one of said multipath signals is rejected per step i) according to a time period over which said SNR level of said one of said multipath signals is below a second predetermined threshold level.

10. The method recited in claim 1 wherein said one of said multipath signals is rejected per step i) according to the number of measurements for which said SNR level of said one of said multipath signals is below a second predetermined threshold level.

11. The method recited in claim 3 further comprising the step of:
   k) enabling said one of said multipath signals for said demodulation operation if it is categorized in said assigned state.
   l) disabling said one of said multipath signals from said demodulation operation if it is rejected.

12. The method recited in claim 1 wherein said steps a) through h) are systematically repeated over time to provide a quantity of multipath signals equivalent to, or greater than, a number of demodulators of said wireless communication device.

13. The method recited in claim 1 for managing multipath signals in a wireless communication receiver device receiving signals from multiple base stations in code division multiple access forward link.

14. A wireless communication device for managing multipath signals, said communication device comprising:
   a searcher adapted to scan for said multipath signals;
   a set of demodulators;
   a processor, said processor coupled to said searcher; and a computer readable memory unit, said computer readable memory unit coupled to said processor, said computer readable memory unit containing program instructions stored therein that execute, via said processor, and cause the processor to perform the steps of:
- a) receiving said multipath signals at said wireless communication receiver device;
- b) finding said multipath signals having sufficient signal strength for demodulation in said searcher of said wireless communication receiver device;
- c) measuring an arrival time of one of said multipath signals;
- d) measuring a signal-to-noise ratio (SNR) level of said one of said multipath signals;
- e) updating said multipath list with said arrival time and said signal-to-noise ratio if said one of said multipath signals is identified based upon said arrival time with one of the multipath signals existing in said multipath list;
- f) identifying newly-found multipath signals and evaluating one of said newly-found multipath signals based on said signal-to-noise ratio for categorization into one of a plurality of states;
- g) evaluating one of said existing multipath signals based on said signal-to-noise ratio for moving said multipath signal from one to another of a plurality of states;
- h) selectively providing said one of said one of said multipath signals for a demodulation operation based upon its state;
- i) selectively rejecting said one of said multipath signals from said multipath list based on said signal-to-noise ratio; and
- j) repeating said steps c) through i) to process all said multipath signals found in step b).

15. The wireless communication device of claim 14 wherein said plurality of states includes three hierarchical states.

16. The wireless communication device of claim 14 wherein said plurality of states includes an assigned state, wherein signals associated with said assigned state are used for an active demodulation operation.

17. The wireless communication device of claim 14 wherein said plurality of states includes a potential state, wherein signals associated with said potential state are not actively used for an active demodulation operation, but which may be likely candidates for a future demodulation operation.

18. The wireless communication device of claim 14 wherein said plurality of states includes a temporary state, wherein said temporary state is not actively used for an active demodulation operation, but which may be likely candidates for categorization in a potential state in a future evaluation.

19. The wireless communication device of claim 14 wherein said one of said multipath signals is categorized per step d), f) and g) according to said SNR level of said one of said multipath signals.

20. The wireless communication device of claim 14 wherein said one of said multipath signals is categorized per step d), f) and g) according to a time period over which said SNR level of said one of said multipath signals is above predetermined threshold level.

21. The wireless communication device of claim 14 wherein said one of said multipath signals is categorized per step d), f) and g) according to the number of measurements for which said SNR level of said one of said multipath signals is above a predetermined threshold level.

22. The wireless communication device of claim 14 wherein said one of said multipath signals is rejected per step i) according to a time period over which said SNR level of said one of said multipath signals is below a second predetermined threshold level.

23. The wireless communication device of claim 14 wherein said one of said multipath signals is rejected per step i) according to the number of measurements for which said SNR level of said one of said multipath signals is below a second predetermined threshold level.

24. The wireless communication device of claim 16 further comprising the step of:
- k) enabling said one of said multipath signals for said demodulation operation if it is categorized in said assigned state.
- l) disabling said one of said multipath signals from said demodulation operation if it is rejected.

25. The wireless communication device of claim 14 wherein said steps a) through h) are systematically repeated over time to provide a quantity of multipath signals equivalent to, or greater than, a number of demodulators of said wireless, communication device.

26. The wireless communication device of claim 14 for managing multipath signals in a wireless communication receiver device receiving signals from multiple base stations in code division multiple access forward link.

27. A computer readable medium containing therein computer readable codes for causing an electronic device to implement a method of managing said multipath signals, said method comprising the steps of:
- a) receiving said multipath signals at said wireless communication receiver device;
- b) finding said multipath signals having sufficient signal strength for demodulation in said searcher of said wireless communication receiver device;
- c) measuring an arrival time of one of said multipath signals;
- d) measuring a signal-to-noise ratio (SNR) level of said one of said multipath signals;
- e) updating said multipath list with said arrival time and said signal-to-noise ratio if said one of said multipath signals is identified based upon said arrival time with one of the multipath signals existing in said multipath list;
- f) identifying newly-found multipath signals and evaluating one of said newly-found multipath signals based on said signal-to-noise ratio for categorization into one of a plurality of states;
- g) evaluating one of said existing multipath signals based on said signal-to-noise ratio for moving said multipath signal from one to another of a plurality of states;
- h) selectively providing said one of said one of said multipath signals for a demodulation operation based upon its state;
- i) selectively rejecting said one of said multipath signals from said multipath list based on said signal-to-noise ratio; and
- j) repeating said steps c) through i) to process all said multipath signals found in step b).

28. The computer readable medium of claim 27 wherein said plurality of states includes three hierarchical states.

29. The computer readable medium of claim 27 wherein said plurality of states includes an assigned state, wherein signals associated with said assigned state are used for an active demodulation operation.

30. The computer readable medium of claim 27 wherein said plurality of states includes a potential state, wherein signals associated with said potential state are not actively used for an active demodulation operation, but which may be likely candidates for a future demodulation operation.

31. The computer readable medium of claim 27 wherein said plurality of states includes a temporary state, wherein said temporary state is not actively used for an active demodulation operation, but which may be likely candidates for categorization in a potential state in a future evaluation.

32. The computer readable medium of claim 27 wherein said one of said multipath signals is categorized per step d), f) and g) according to said SNR level of said one of said multipath signals.

33. The computer readable medium of claim 27 wherein said one of said multipath signals is categorized per step d), f) and g) according to a time period over which said SNR level of said one of said multipath signals is above predetermined threshold level.

34. The computer readable medium of claim 27 wherein said one of said multipath signals is categorized per step d), f) and g) according to the number of measurements for which said SNR level of said one of said multipath signals is above a predetermined threshold level.

35. The computer readable medium of claim 27 wherein said one of said multipath signals is rejected per step i) according to a time period over which said SNR level of said one of said multipath signals is below a second predetermined threshold level.

36. The computer readable medium of claim 27 wherein said one of said multipath signals is rejected per step i) according to the number of measurements for which said SNR level of said one of said multipath signals is below a second predetermined threshold level.

37. The computer readable medium of claim 29 further comprising the step of:
  k) enabling said one of said multipath signals for said demodulation operation if it is categorized in said assigned state.
  l) disabling said one of said multipath signals from said demodulation operation if it is rejected.

38. The computer readable medium of claim 27 wherein said steps a) through h) are systematically repeated over time to provide a quantity of multipath signals equivalent to, or greater than, a number of demodulators of said wireless communication device.

39. The computer readable medium of claim 27 for managing multipath signals in a wireless communication receiver device receiving signals from multiple base stations in code division multiple access forward link.

* * * * *

UNITED STATES PATENT AND TRADEMARK OFFICE
CERTIFICATE OF CORRECTION

PATENT NO.    : 6,725,016 B1    Page 1 of 1
DATED         : April 20, 2004
INVENTOR(S)   : Gibong Jeong et al.

It is certified that error appears in the above-identified patent and that said Letters Patent is hereby corrected as shown below:

<u>Title page,</u>
Item [73], Assignee, below "Koninklijke Philips Electronics N.V." add -- Texas Instruments Incorporated, Dallas TX (US) --.

Signed and Sealed this

Eighteenth Day of October, 2005

JON W. DUDAS
*Director of the United States Patent and Trademark Office*